3,256,059
PROCESS FOR THE RECOVERY OF SODIUM CARBONATE AND SODIUM SULFATE FROM SPENT SULFITE LIQUOR
William A. Biggs, Jr., Hartsville, S.C., assignor to Sonoco Products Company, Hartsville, S.C., a corporation of South Carolina
Filed May 6, 1963, Ser. No. 278,052
9 Claims. (Cl. 23—48)

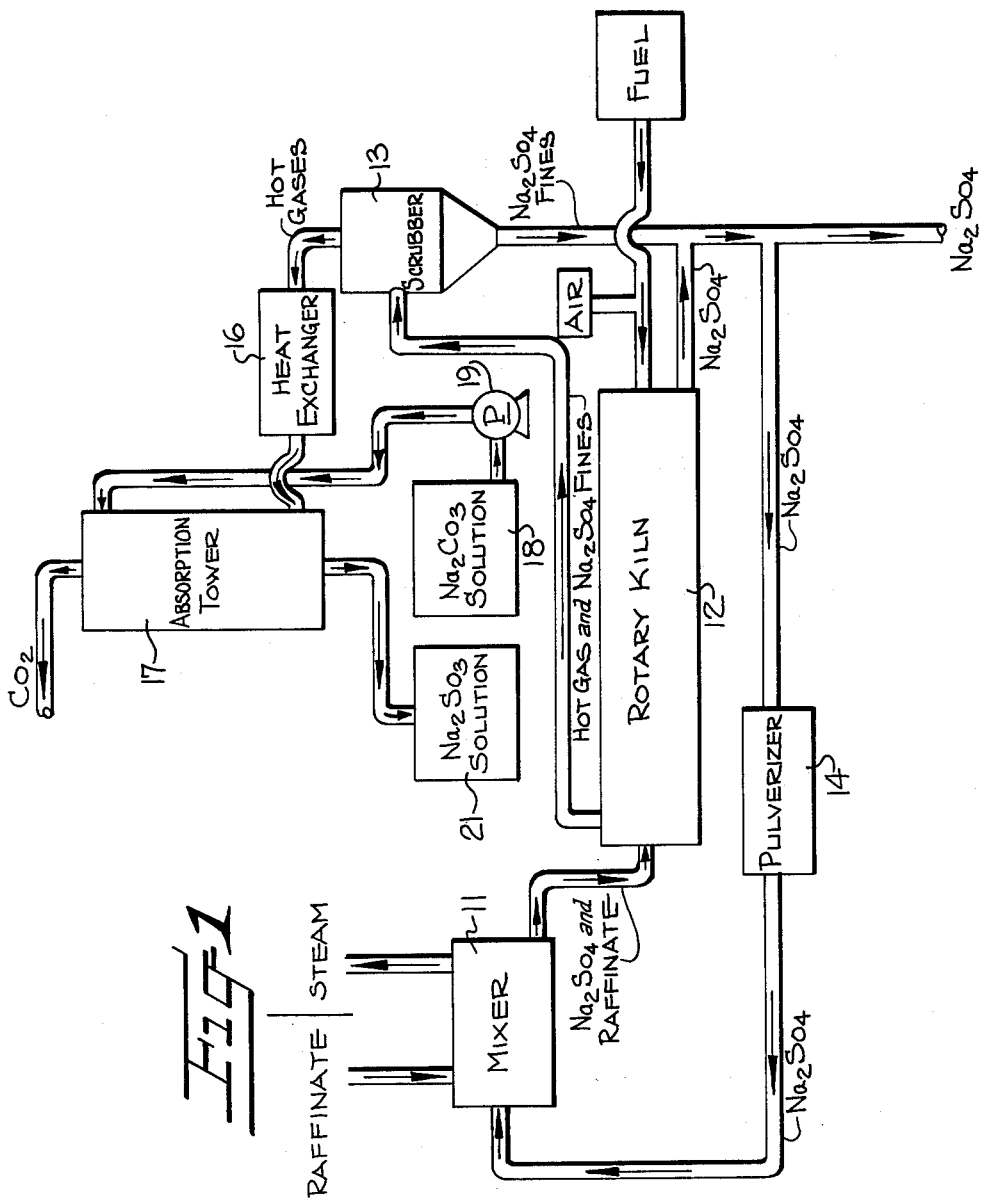

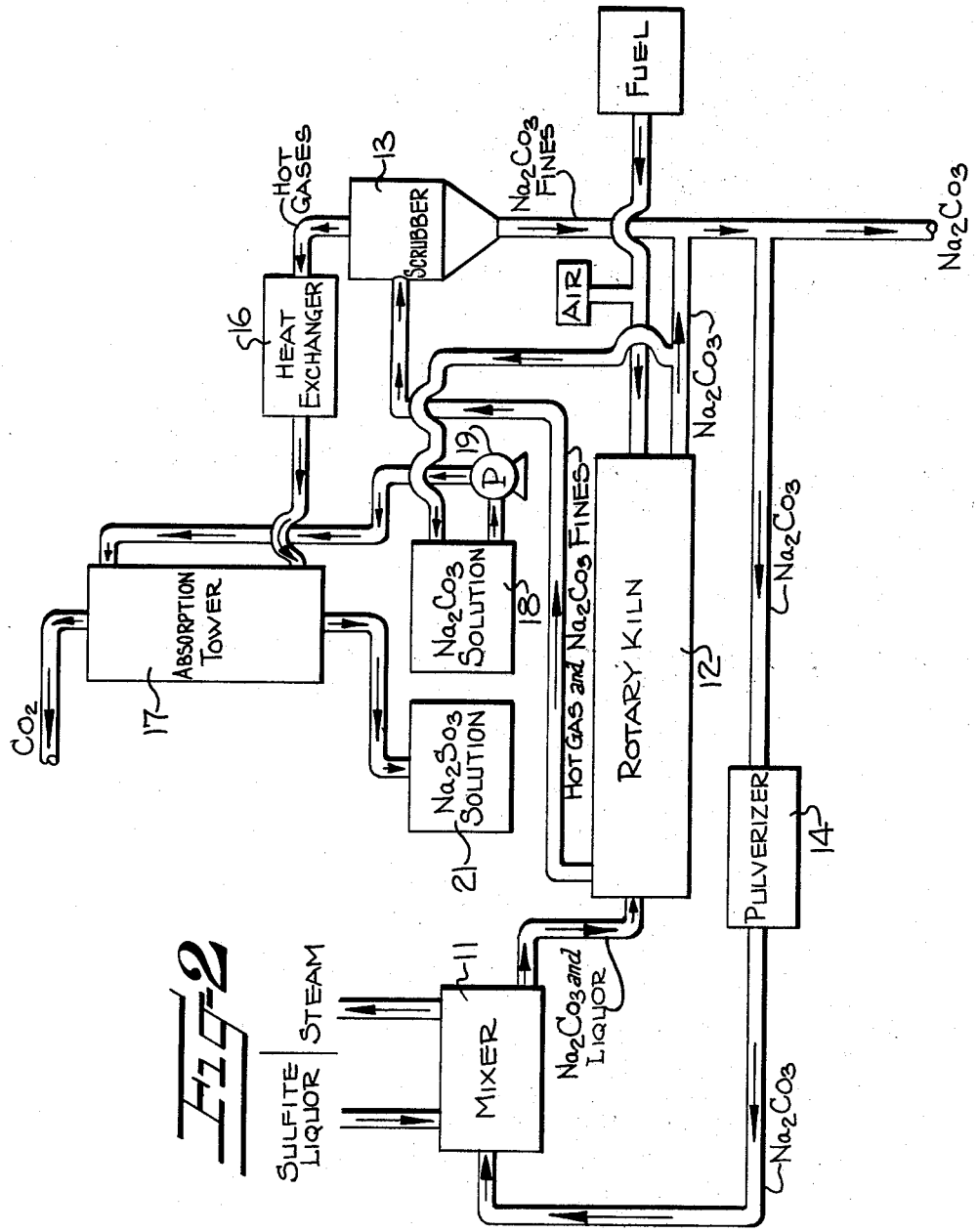

This invention relates to chemical recovery processes and more particularly to a process for recovering chemicals from waste liquor resulting from a sodium based sulfite pulping process.

In widespread use today for the production of wood pulp and paper is the pulping process referred to generally as the "sodium based sulfite" process. A by-product of this sulfite process is a solids containing liquor referred to as sulfite black liquor which contains primarily sodium, sulfur, and organic materials such as lignin. As a matter of convenience, it has been proposed to dispose of this sulfite black liquor by dumping it into streams and rivers but the liquor has a highly contaminating effect and produces a serious stream pollution problem. Stream pollution in many areas has been the subject of strict legislative control which, in effect, precludes the dumping of such liquor in any substantial quantities in bodies of water.

On the other hand, it is widely recognized that such black liquor contains valuable chemicals the recovery of which can be of considerable economic benefit. Many processes have therefore been proposed for recovering these valuable black liquor chemicals or constituents. In one of such chemical recovery processes, the spent liquor is burned in a kraft recovery furnace to produce a smelt consisting primarily of sodium sulfide which is subsequently oxidized to sodium sulfite. However, the available processes for producing sodium sulfite from sodium sulfide require a substantial plant investment which is difficult to economically justify and the processes are difficult to properly control. Another chemical recovery process, the wet combustion or Zimmerman liquor recovery process which utilizes high pressures and temperatures for decomposing the organic matter in dilute waste liquor is considered too expensive to be practical due to the amount of heat required to evaporate the water in the liquor. Furthermore, this process is characterized by many engineering problems such as scaling of the equipment. Still another waste liquor recovery process is generally referred to as the AST method which involves the pyrolysis of finely divided spent liquor particles. The AST process is not complicated in operation but it produces many combustible gases which must be taken in consideration such as hydrogen and carbon monoxide and the operating temperatures are so high that severe corrosion of the equipment is encountered. It is generally considered that due to many engineering problems this latter liquor recovery method has not reached that degree of perfection such that it can be considered commercially feasible.

Another approach to the problem of black liquor utilization is described and claimed in U.S. Patent No. 2,744,927 for Solvent Extraction of Black Liquor—Copenhaver et al. In the method of this patent, sulfite black liquor is acidified with sulfuric acid and the acidified liquor is solvent extracted to recover commercially valuable acetic and formic acids. The material or "raffinate" remaining after acid recovery may be used directly in various other processes capable of utilizing the valuable chemicals in the raffinate such as in a kraft pulping process as described and claimed in U.S. Patent No. 2,974,081. However, the integration of raffinate with kraft pulping is not economically attractive unless the kraft pulping process is closely adjacent the raffinate source as the cost of transporting raffinate with its high water content is excessively high. If it is not desired to use the raffinate directly in such other processes, it may be subjected to one of the presently known chemical recovery processes referred to above with reference to the treatment of sulfite black liquor although the various problems discussed relative thereto still remain.

The various present day processes for recovering chemicals from sulfite black liquor which have been referred to above can generally be said to require a prohibitively high capital investment in equipment and all are characterized by a high cost of operation so that it is frequently difficult to justify the use of such processes from a practical standpoint. Also, many of the chemical recovery processes discussed above involve the conversion of the chemicals present in the liquor or raffinate into other forms adding to the complexity and consequently the costs of the process. The recovery of acids from black liquor and subsequently utilizing the raffinate by-product is in general an economically sound operation but there is still considerable room for improvement at least as far as economics is concerned. For instance, it is sometimes necessary to transport such raffinate over considerable distances to a point of use such as a kraft mill so that this shipping cost has a depressing effect on the potential profits for such a process.

In another proposed process for recovering chemicals from sulfite liquor, the liquor is evaporated to dryness and burnt in a continuous process by the utilization of a continuously circulating mass of a granular refractory substance such as pebbles which are heated in a heater and subsequently contacted with the liquor. The liquor is evaporated on contact with the heated pebbles and the pebbles with liquor solids adhering thereto are conveyed to the heater where the combustible portion of the liquor solids are burned thus reheating the pebbles for recycling. Such a process has been generally referred to as a "fluidized bed" process. In addition to its high cost of operation, the difficulties of such a process is readily apparent in that separation of the pebbles from the residue and recycling of the pebbles poses many engineering problems. Furthermore, it is highly questionable if effective burning of the combustible solids and cleaning of the pebbles during each cycle can be accomplished.

Accordingly, the present invention contemplates the provision of a new and novel process for recovering valuable chemicals from a solids containing liquor obtained as a by-product of a sodium based sulfite pulping process.

Another object of this invention is to provide a new and novel process for the evaporation and burning of sulfite black liquor or raffinate so as to recover valuable constituents by means of a fluidized bed requiring only the processed material.

Still another object of this invention is to provide a new and novel process for the evaporation and burning of sulfite black liquor or its raffinate after acid recovery in a furnace to recover continuously valuable chemicals having a high degree of purity at a low cost.

A further object of this invention is to provide a new and novel process for the recovery of sodium carbonate from sulfite black liquor obtained as a by-product of a sodium based sulfite pulping process.

A still further object of this invention is to provide a new and novel process for the recovery of sodium sulfate from the raffinate of black liquor obtained as a by-product of a sodium based sulfite pulping process which has been subjected to an acid recovery process.

Still another object of this invention is to provide a new and novel process for recovering valuable constituents from sulfite waste liquor or its raffinate after acid recovery which may be carried out with equipment requiring a relatively low capital investment and which operates in a simple but highly efficient manner so as to provide a high rate of return and which permits virtually all of the valuable constituents in the liquor or raffinate to be recovered with virtually no loss.

Other objects and advantages of the invention will become apparent from the following description taken in connection with the accompanying drawings.

In general, the objects of the invention and related objects are accomplished by mixing with a solids containing liquor obtained as a by-product of a sodium based sulfite pulping process a particulate non-combustible constituent which is the constituent recovered from the liquor by the process of the invention. In one embodiment of the invention, this constituent is sodium sulfate which is mixed with the raffinate of acid extracted sulfite liquor. In general, the particulate constituent is mixed with the solids containing liquor at a temperature for producing evaporation of the volatile components of the liquor. During the mixing step, the solids in the solids containing liquor are deposited on the surfaces of the particles of the non-combustible constituent and evaporation of the liquor is obtained. The products of evaporation are removed from the mixture and the mixture is transferred to suitable combustion apparatus where the combustible constituents, primarily organic matter, of the mixture are burned to obtain a residue of the non-combustible constituent such as sodium sulfate in the aforementioned embodiment. The burning step raises the temperature of the non-combustible constituent residue to approximately the temperature at which the constituent is utilized in the mixing step and a portion of this heated non-combustible constituent residue is recycled to provide the non-combustible constituent mixed with the solids containing liquor in the mixing step.

The novel features which are believed to be characteristic of the invention are set forth with particularity in the appended claims. The invention itself may be best understood by reference to the following description taken in conjunction with the accompanying drawing in which:

FIGURE 1 is a flow diagram illustrating apparatus for carrying out one embodiment of the process of the invention; and FIGURE 2 is a flow diagram similar to FIGURE 1 including the same apparatus for carrying out another embodiment of the process of the invention.

Referring now to the drawing and to FIGURE 1 in particular, there is shown a flow diagram with apparatus illustrated schematically of a process for recovering sodium sulfate or what is generally referred to as "salt cake" from the "raffinate" of sodium based sulfite waste liquor. Although the process of the invention is also used to recover valuable constituents or chemicals from a solids containing sulfite liquor broadly such as untreated sulfite waste liquor as will be explained hereinafter, in the embodiment of the FIGURE 1, the material processed in accordance with the invention is that material generally referred to as "raffinate." The raffinate is the resulting product of sulfite liquor from which organic acids such as acetic and formic acid have been extracted and one process for extracting acids from sulfite liquor is described and claimed in the above-referred-to U.S. Patent No. 2,744,927.

The raffinate remaining after extraction of the acids from the sulfite waste liquor contains both sodium and sulfur which are extracted in accordance with the process of the invention in the form of sodum sulfate. As is well known, the sulfite liquor is normally a dilute by-product of a sodium based sulfite pulping process having a concentration of approximately 10% of dissolved solids. For reasons of economics, the liquor from which the raffinate is formed is first concentrated by means of evaporators or the like so that after acid recovery, a raffinate having a solids concentration within the range of appoximately 50–75% is preferably obtained.

As specifically illustrative of the invention, the raffinate to be processed is introduced into a blender or mixer 11 of any suitable design. The raffinate introduced into the mixer is preferably at a high temperature and is mixed with sodium sulfate or "salt cake" in finely divided particulate form also introduced into the mixer. The sodium sulfate which, as will be explained hereinafter, is a recycled portion of the sodium sulfate obtained with the process of the invention, is at a temperature sufficient to produce evaporation of the raffinate and the products of evaporation, primarily steam, are removed from the mixer in any conventional manner as shown diagrammatically in FIGURE 1. If desired, the steam removed from the mixer may be used for its heat value in any associated process.

The recycled particulate sodium sulfate is thoroughly mixed with the raffinate in the mixer so that the organic solids in the raffinate are distributed as a very thin film over the surface of the sodium sulfate particles. As a result of the evaporation of the raffinate brought about by the hot sodium sulfate, the resulting mixture of sodium sulfate and raffinate after evaporation has a semi-dry consistency. It has been found in practice that a sodium sulfate temperature of between 750° F. and 1250° F. is generally adequate to produce the desired evaporation of raffinate when mixed therewith in the mixer 11. It has also been found that the desired results of the invention are obtained when the ratio of sodium sulfate to raffinate mixed in the mixer 11 is within the range of approximately 2:1 to 9:1.

After evaporation in the mixer 11, this semi-dry mass of sodium sulfate and raffinate is then conveyed to suitable combustion apparatus such as a rotary kiln 12 wherein the combustible constituents of the raffinate (primarily organic solids) are burned, preferably in an oxidizing atmosphere, with combustion sustained primarily by the heat of combustion of the organic matter. An oxidizing atmosphere is provided preferably by draft air as shown. Auxiliary heat for the burning step, where necessary, may be applied by either direct or indirect means such as by the introduction of any suitable combustion supporting medium such as oil or gas into the kiln 12.

The products of combustion in the rotary kiln consists primarily of finely divided sodium sulfate dust or "fines" entrained in the combustion gases which are composed principally of sulfur dioxide, carbon dioxide and steam. These combustion gases and fines are removed from the kiln 12 in any suitable manner. The residue obtained by the burning step, which is continuously discharged from the kiln, is primarily hot anhydrous sodium sulfate of a substantial purity essentially free of organic matter and containing only a trace of carbon. The mixture of hot combustion gases and sodium sulfate fines removed from the kiln are conducted to a scrubber 13 wherein the sodium sulfate fines are removed and subsequently discharged into the sodium sulfate residue stream discharged from the kiln 12.

As previously referred to, a portion of the sodium sulfate residue taken from the kiln to which fines are preferably added as explained above is recycled in a heated condition to provide the sodium sulfate mixed with the raffinate in the mixer in the mixing step. Preferably this recycled portion of sodium sulfate is comminuted in a pulverizer 14 to reduce the particle size of the sodium sulfate and thereby obtain maximum surface area for absorption of the raffinate. Thus this continuously recycled sodium sulfate provides what is generally referred to as a "fluidized bed" using only the material available in the raffinate and produced in the process of the invention. It should be understood that although a separate pulverizer 14 is provided for reducing the particle size of the sodium sulfate, it is within the scope of the invention to provide a single apparatus by means of which both the mixing and pulverizing steps may be combined in a single operation.

The novel process of the invention also includes a recovery operation for recovering the sulfur which is present in the combustion gases withdrawn from the kiln 12 in the form of sulfur dioxide. As shown in FIGURE 1, the hot gases from which sodium sulfate fines have been removed in the scrubber 13 are conducted from the scrubber to a heat exchanger 16 wherein the heat value of the gases may be recovered by the generation of steam. The gases leaving the heat exchanger 16 are then conducted to an absorption tower 17 of any conventional construction wherein the gases are passed countercurrently through a solution of sodium carbonate preferably pumped from a supply tank 18 to the absorption tower 17 by means such as a pump 19.

The combustion gases are thus processed in the absorption tower and the carbon dioxide and inert gases contained in the gases are discharged from the tower 17 as shown. The sulfur dioxide in the gases reacts with the sodium carbonate solution to form sodium sulfite which is removed from the bottom of the absorption tower and collected in a suitable container or tank 21 for subsequent use such as a pulping chemical in a sulfite pulp plant.

Referring now to FIGURE 2, the novel process of the invention, which as referred to above may be used to treat any solids containing liquor, is also used to obtain sodium carbonate or what is generally referred to as "soda ash" from waste liquor obtained from a sodium based sulfite pulping process. As such sulfite liquor has not been subjected to an acid recovery process as described above for obtaining raffinate, it therefore contains additional chemicals which are not present in the raffinate.

As shown in FIGURE 2, the apparatus for carrying out this embodiment of the invention is essentially the same as the apparatus of the embodiment of FIGURE 1 and like numerals have been used to identify like parts. Using generally the same method steps as in the process of the embodiment of FIGURE 1 except where different chemicals result, finely divided particulate sodium carbonate, preferably comminuted in the pulverizer 14 is mixed in a mixer 11 with hot concentrated sulfite black liquor so that the organic solids in the liquor are distributed over the particles of sodium carbonate as a thin film. The temperature of the sodium carbonate is sufficiently high to produce evaporation of the volatile constituents in the black liquor and the products of evaporation are removed from the mixer 11 in the form of steam.

After evaporation, the resulting semi-dry mixture or mass is conducted to the rotary kiln 12 wherein it is subjected to a burning operation. The products of combustion comprising hot gases and sodium carbonate fines are removed from the kiln 12 as shown and are conducted to the scrubber 13. The organic matter in the mixture is burned preferably in an oxidizing atmosphere with the organic matter sustaining combustion and any necessary auxiliary heat being provided by a suitable fuel as in the embodiment of FIGURE 1.

The residue obtained from the burning operation in the kiln 12 is primarily sodium carbonate having a substantial degree of purity. The sodium carbonate fines entrained in the gaseous products of combustion are removed in the scrubber 13 and added to the sodium carbonate residue discharged from the kiln 12 to provide a continuous stream of hot sodium carbonate. In accordance with the novel process of the invention, a portion of this stream of hot sodium carbonate is recycled and after processing in the pulverizer 14 provides the sodium carbonate mixed with the liquor in the mixer 11.

As in the embodiment of FIGURE 1, the hot gases from the scrubber 13 containing principally sulfur dioxide, carbon dioxide and steam are first passed through the heat exchanger 16 for heat recovery and then passed through a solution of sodium carbonate countercurrently in the absorption tower 17 with the carbon dioxide and inert gases being discharged from the tower. A sodium carbonate solution from the supply tank 18 is pumped by means of the pump 19 to the tower 17 for reaction with the sulfur dioxide in the gases to produce sodium sulfite as described above which may be subsequently used as a pulping chemical. If desired, another portion of the sodium carbonate stream from the kiln 12 may be conveyed to the tank 18 as shown in FIGURE 2 to maintain a continuously available supply of sodium carbonate.

The following are illustrative but non-limiting examples of the process of the invention.

EXAMPLE I

Sodium sulfate recovery process

Raffinate at a concentration of approximately 55% solids obtained by acidifying sodium based sulfite spent liquor with sulfuric acid and solvent extracting liberated acetic and formic acids was mixed at a temperature of approximately 215° F. with particulate sodium sulfate at a temperature of approximately 950° F. in a mixer. The bulk of the water in the raffinate was driven off as steam by the heat of the mixture and this steam was removed. During the mixing step, the organic solids in the raffinate were distributed as a very thin film over the surface of the particles of sodium sulfate. This semi-dry mixture was then fed into a rotary kiln maintained at a temperature of approximately 950° F. and the organic matter in the mixture burned in an oxidizing atmosphere provided by draft air. The burning organic matter provided the primary source of heat for the burning step and an auxiliary heat source was provided by the introduction of gas into the kiln. The ratio of sodium sulfate to raffinate in the mixer was 5:1 and the retention time of the mixture in the kiln was approximately seven (7) minutes. The burning of the organic matter of the mixture in the kiln produced a residue consisting primarily of sodium sulfate which was discharged from the kiln at a rate of approximately 300 cubic feet an hour. The sodium sulfate residue continuously discharged from the kiln had the following composition:

|  | Percent |
| --- | --- |
| Sodium sulfate | 95.95 |
| Sodium carbonate | 0.80 |
| Carbon | 3.25 |
| Total | 100.00 |

A portion of the hot sodium sulfate residue from the kiln was then passed through a pulverizer for comminuting the sodium sulfate mass into a finely divided particulate form and then conveyed to the mixer for mixing with raffinate as explained above.

EXAMPLE II

Sodium sulfate recovery process

In Example II, the same process generally as Example I was employed except the ratio of the recycled sodium sulfate to raffinate in the mixer was 2:1. Also, the temperature of the burning mixture in the kiln was approximately 1200° F. and the retention time in the kiln for the mixture was approximately 14.4 minutes. The resulting residue of sodium sulfate produced was discharged from the kiln at a rate of approximately 400 cubic feet per hours and this residue had the following composition:

|  | Percent |
| --- | --- |
| Sodium sulfate | 95.32 |
| Sodium carbonate | 2.44 |
| Sodium sulfide | 0.68 |
| Carbon | 1.56 |
| Total | 100.00 |

EXAMPLE III

Sodium carbonate recovery process

Waste liquor obtained from a sodium based sulfite pulping process at a concentration of approximating 37.7% solids was mixed at a temperature of approximately 215°

F. with particulate sodium carbonate at a temperature of approximately 1000° F. in a mixer. The bulk of the water in the liquor was driven off as steam by the heat of the mixture and this steam was removed. During the mixing step, the organic solids in the liquor were distributed as a very thin film over the surface of the particles of sodium carbonate. This semi-dry mixture was then fed into combustion apparatus maintained at a temperature of approximately 1000° F. and the organic matter in the mixture burned in an oxidizing atmosphere provided by draft air. The burning organic matter provided the primary source of heat for the burning step. The ratio of sodium carbonate to liquor in the mixer was 1:1. The burning of the organic matter of the mixture produced a residue consisting primarily of sodium carbonate. This sodium carbonate residue was found to have the following composition:

|  | Percent |
| --- | --- |
| Sodium carbonate | 90.0 |
| Sodium sulfide | 1.0 |
| Sodium sulfate | 4.0 |
| Carbon | 5.0 |
| Total | 100.0 |

A portion of the hot sodium carbonate residue from the combustion apparatus was pulverized to put the sodium carbonate into finely divided particulate form after which it was then conveyed to the mixer for mixing with liquor as explained above.

With the novel process of this invention, there has been provided a method for removing both the water and organic matter from waste liquor obtained as a by-product of a sodium based sulfite pulping process to obtain valuable chemicals present in the liquor or its derivative. The resulting residue obtained from various embodiments of the process of the invention is a compound which is highly useful in many commercial processes so that a considerable saving in the cost of the sulfite pulping process is effected. Furthermore, the problem encountered in the disposing of waste sulfite liquor in streams and rivers is no longer present as those portions of the liquor not recovered for subsequent use are disposed of in the form of gases in the efficient and low cost processes of the invention. With the use of a portion of the constituent recovered from the liquor in a fluidized bed technique as incorporated in the process of the invention, the introduction of foreign materials such as pebbles is avoided and an end product having a substantial degree of purity is obtained. The waste liquor recovery process of the invention has none of the problems encountered with the use of presently employed waste liquor recovery processes and it permits the recovery of the valuable constituents in either untreated sodium based sulfite liquor or the raffinate of liquor from which acids have been stripped without the need for changing these constituents to any intermediate chemical forms. The process of the invention is particularly useful in obtaining sodium sulfate from the raffinate of acid extracted waste liquor for shipment to distant customers as the shipment of the valuable constituents in the raffinate rather than the heavy raffinate containing a large amount of water effects a considerable saving in shipment and handling costs.

While there has been described what is presently considered to be the preferred embodiments of the invention, it will be understood by those skilled in the art that various changes and modifications may be made therein without departing from the invention, and therefore, it is the aim of the appended claims to cover all such changes and modifications as fall within the true spirit and scope of the invention.

Having thus described the invention, what is claimed is:

1. A continuous process for recovering sodium sulfate from the raffinate of acid extracted waste sulfite liquor comprising the steps of, mixing with said raffinate particulate sodium sulfate at a temperature for producing evaporation of the volatile components of said raffinate to deposit the solids in said raffinate on the surface of said particles, removing the products of evaporation from said mixture, burning the combustible constituents of said mixture to obtain a residue of sodium sulfate at approximately said mixing temperature and recycling a portion of said residue to provide the sodium sulfate mixed with said raffinate in said mixing step.

2. A continuous process for recovering sodium carbonate from sodium based sulfite black liquor comprising the steps of, mixing with said black liquor particulate sodium carbonate at a temperature for producing evaporation of the volatile components of said black liquor to deposit the solids in said liquor on the surface of said sodium carbonate particles, removing the products of evaporation from said mixture, burning the combustible constituents in said mixture to obtain a residue of sodium carbonate at approximately said mixing temperature and recycling a portion of sodium carbonate residue to provide the sodium carbonate mixed with said black liquor in said mixing step.

3. A continuous process for recovering sodium sulfate from the raffinate of acid extracted waste sulfite liquor comprising the steps of, mixing with said raffinate particulate sodium sulfate at a temperature for producing evaporation of the volatile components of said raffinate to deposit the solids in said raffinate on the surface of said particles, removing the products of evaporation from said mixture, transferring said mixture to a combustion apparatus, burning the combustible constituents of said mixture in said combustion apparatus to obtain a residue of sodium sulfate at approximately said mixing temperature, introducing a combustion supporting medium into said combustion apparatus during said burning step, withdrawing the combustion gases formed during said burning step and recycling a portion of said sodium sulfate residue to provide the sodium sulfate mixed with said raffinate in said mixing step.

4. A process in accordance with claim 3 including the step of comminuting said recycled portion of sodium sulfate into finely divided particles.

5. A continuous process for recovering sodium sulfate from the raffinate of acid extracted waste sulfite liquor comprising the steps of, providing raffinate at a concentration of approximately 50–75% solids, mixing with said raffinate particulate sodium sulfate at a temperature of between approximately 750–1250° F. for producing evaporation of the volatile components of said raffinate to deposit the solids in said raffinate on the surface of said particles, removing the products of evaporation from said mixture, transferring said mixture to a combustion apparatus, burning the combustible constituents of said mixture in said combustion apparatus to obtain a residue of sodium sulfate at approximately said mixing temperature, introducing a combustion supporting medium into said combustion apparatus during said burning step, withdrawing the combustion gases formed during said burning step, and recycling a portion of said sodium sulfate residue to provide the sodium sulfate mixed with said raffinate in said mixing step.

6. A continuous process for recovering sodium sulfate from the raffinate of acid extracted waste sulfite liquor comprising the steps of, mixing with said raffinate particulate sodium sulfate at a temperature for producing evaporation of the volatile components of said raffinate to deposit the solids in said raffinate on the surface of said particles, removing the products of evaporation from said mixture, burning the combustible constituents of said mixture to obtain a residue of sodium sulfate at approximately said mixing temperature, withdrawing the combustion gases formed during said burning step, separating the particles of entrained sodium sulfate from said withdrawn combustion gases, adding said separated particles of sodium sulfate to said sodium sulfate residue and recycling a portion of said sodium sulfate to provide the sodium sulfate mixed with said raffinate in said mixing step.

7. A process in accordance with claim 6 including the step of recovering the sulfur contained in said withdrawn combustion gases.

8. A process in accordance with claim 7 wherein said recovery step includes contacting said combustion gases subsequent to said separating step with a solution of sodium carbonate to react the sulfur dioxide in said gases with said sodium carbonate and thereby form a solution of sodium sulfite.

9. A continuous process for recovering sodium sulfate from the raffinate of acid extracted waste sulfite liquor comprising the steps of, providing said raffinate at a concentration of approximately 50–75% solids, mixing with said raffinate particulate sodium sulfate at a temperature of between approximately 750–1250° F. and at a ratio of sodium sulfate to raffinate within the range of approximately 2:1 to 9:1 for producing evaporation of the volatile components of said raffinate and to deposit the solids in said raffinate on the surface of said sodium sulfate particles, removing the products of evaporation from said mixture, transferring said mixture to a combustion apparatus, burning the combustible constituents of said mixture in said combustion apparatus to obtain a residue of sodium sulfate at approximately said mixing temperature, comminuting a portion of said sodium sulfate residue into finely divided particles and recycling said comminuted portion of sodium sulfate to provide the sodium sulfate mixed with raffinate in said mixing step.

References Cited by the Examiner

UNITED STATES PATENTS

| | | | |
|---|---|---|---|
| 1,702,586 | 2/1929 | Bradley et al. | 23—48 X |
| 1,886,580 | 11/1932 | Pierce | 23—121 |
| 2,056,746 | 10/1936 | Strupp | 23—48 X |
| 2,568,239 | 9/1951 | Lonngren | 23—48 X |

OSCAR R. VERTIZ, *Primary Examiner.*

MAURICE A. BRINDISI, *Examiner.*

G. OZAKI, *Assistant Examiner.*